United States Patent
Muppalla et al.

(10) Patent No.: US 11,461,221 B2
(45) Date of Patent: Oct. 4, 2022

(54) ACTION VALIDATION FOR DIGITAL ASSISTANT-BASED APPLICATIONS

(71) Applicant: Google LLC, Mountain View, CA (US)

(72) Inventors: Dharma Muppalla, Lawrenceville, NJ (US); Nikhil Rao, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/482,187

(22) PCT Filed: Jun. 5, 2019

(86) PCT No.: PCT/US2019/035616
§ 371 (c)(1),
(2) Date: Jul. 30, 2019

(87) PCT Pub. No.: WO2020/246975
PCT Pub. Date: Dec. 10, 2020

(65) Prior Publication Data
US 2021/0294724 A1    Sep. 23, 2021

(51) Int. Cl.
*G06F 9/44* (2018.01)
*G06F 9/455* (2018.01)
(Continued)

(52) U.S. Cl.
CPC ........... *G06F 11/366* (2013.01); *G06F 3/167* (2013.01); *G06F 11/3664* (2013.01);
(Continued)

(58) Field of Classification Search
CPC .............. G06F 11/366; G06F 11/3664; G06F 11/3692; G06F 16/243; G06F 16/24565; G06F 3/167
See application file for complete search history.

(56) References Cited

U.S. PATENT DOCUMENTS

2017/0352352 A1* 12/2017 Wang ................. G10L 25/72
2018/0052664 A1*  2/2018 Zhang ............. G06F 16/90332
(Continued)

FOREIGN PATENT DOCUMENTS

WO    2016111881    7/2016

OTHER PUBLICATIONS

Shantanu Dasgupta, Developing a PDA to Control Device using Proposed Algorithm, 2017, pp. 1184-1190. https://ieeexplore.ieee.org/stamp/stamp.jsp?tp=&arnumber=8342738&isnumber=8342520 (Year: 2017).*

(Continued)

*Primary Examiner* — Mongbao Nguyen
(74) *Attorney, Agent, or Firm* — Middleton Reutlinger

(57) ABSTRACT

Validating actions in a digital assistant-based application is provided. The system identifies an application with a conversational interface. The system selects an action from an action repository and generates, via a natural language processor, a trigger phrase for input into the application. The system executes the application to process the trigger phrase to identify an action of the application. The system identifies a parameter used by the application to execute the action, and generates, based on the parameter and via execution of the conversational interface of the application, a first query responsive to the trigger phrase. The system generates a first response to the first query for input into the application. The system determines, based on execution of the application to process the first response, a state of the application. The system evaluates the state to determine an error code and provide a notification based on the error code.

19 Claims, 3 Drawing Sheets

(51) Int. Cl.
  G06F 9/445 (2018.01)
  G06F 11/36 (2006.01)
  G06F 16/242 (2019.01)
  G06F 16/2455 (2019.01)
  G06F 3/16 (2006.01)

(52) U.S. Cl.
  CPC ........ G06F 11/3692 (2013.01); G06F 16/243 (2019.01); G06F 16/24565 (2019.01)

(56) References Cited

U.S. PATENT DOCUMENTS

| | | | | |
|---|---|---|---|---|
| 2018/0096675 | A1* | 4/2018 | Nygaard | G10L 13/04 |
| 2018/0143857 | A1* | 5/2018 | Anbazhagan | G06F 40/35 |
| 2018/0190274 | A1* | 7/2018 | Kirazci | G10L 15/1822 |
| 2018/0211654 | A1* | 7/2018 | Jacobson | G10L 15/07 |
| 2018/0233132 | A1* | 8/2018 | Herold | H04W 4/33 |
| 2018/0247654 | A1 | 8/2018 | Bhaya et al. | |
| 2018/0329957 | A1* | 11/2018 | Frazzingaro | G06F 16/24564 |
| 2018/0373786 | A1* | 12/2018 | Vora | G06F 16/3338 |
| 2019/0122001 | A1 | 4/2019 | Bradley et al. | |
| 2019/0267005 | A1* | 8/2019 | Owens | G10L 15/18 |
| 2019/0295544 | A1* | 9/2019 | Garcia | G06F 40/30 |
| 2020/0065218 | A1* | 2/2020 | Bhosale | G06F 11/0793 |
| 2020/0098368 | A1* | 3/2020 | Lemay | G10L 15/28 |
| 2020/0234697 | A1* | 7/2020 | Webster | G10L 13/00 |
| 2020/0234699 | A1* | 7/2020 | Webster | G06F 11/3664 |
| 2020/0258518 | A1* | 8/2020 | Stachura | G10L 15/08 |
| 2020/0304636 | A1* | 9/2020 | Trim | H04L 67/5683 |
| 2020/0304955 | A1* | 9/2020 | Gross | G06F 3/04883 |
| 2020/0311208 | A1 | 10/2020 | Koohmarey et al. | |
| 2021/0019410 | A1* | 1/2021 | Huang | G06F 21/566 |
| 2021/0165664 | A1* | 6/2021 | Gould | G06F 16/245 |

OTHER PUBLICATIONS

Ruhi Sarikaya, The Technology Behind Personal Digital Assistants, 2017, pp. 67-80. https://ieeexplore.ieee.org/stamp/stamp.jsp?tp=&arnumber=7814394 (Year: 2017).*

David R Large, Assessing Cognitive Demand during Natural Language Interactions with a Digital Driving Assistant, 2016, pp. 67-73. https://dl.acm.org/doi/pdf/10.1145/3003715.3005408 (Year: 2016).*

Azat Khusnutdinov, Open source platform Digital Personal Assistant, 2018, pp. 45-50. https://ieeexplore.ieee.org/stamp/stamp.jsp?tp=&arnumber=8418047 (Year: 2018).*

European Patent Office; International Search Report and Written Opinion of PCT Ser. No. PCT/US2019/035616; 14 pages; dated Apr. 2, 2020.

Maria Gretalita N.W., "Visual Usability Design of Financial Personal Assistant Application" 2017, pp. 142-147. https://dl.acm.org/doi/pdf/10.1145/3176653.3176700. 1 page.

European Patent Office; Communication pursuant to Article 94(3) issued in Application No. 19740095.5, 8 pages, dated Feb. 9, 2022.

Intellectual Property India; Examination Report issued in Application No. IN202127045295; 5 pages; dated Mar. 9, 2022.

* cited by examiner

ACTION VALIDATION FOR DIGITAL ASSISTANT-BASED APPLICATIONS

CROSS-REFERENCES TO RELATED APPLICATIONS

This application is a U.S. National Stage under 35 U.S.C. § 371 of International Patent Application No. PCT/US2019/035616, filed Jun. 5, 2019 and designating the United States, which is hereby incorporated by reference herein in its entirety.

BACKGROUND

Applications can be developed by a developer. As applications become increasingly complex due to sophisticated features or multiple interactions, it can be difficult to identify errors or malfunctions, and remedy such errors or malfunctions.

SUMMARY

At least one aspect is directed to a system to validate actions in a digital assistant-based application. The system can include a data processing system having one or more processors. The data processing system can identify an application provided by an application developer device of an application developer. The application can have a conversational interface. The data processing system can select, for the application, an action from an action repository of the data processing system. The data processing system can generate, based on the action and via a natural language processor of the data processing system, a trigger phrase for input into the application. The data processing system can execute the application to process the trigger phrase via the conversational interface. The data processing system can identify an action of the application responsive to the trigger phrase. The data processing system can identify a parameter used by the application to execute the action of the application. The data processing system can generate, based on the parameter and via execution of the conversational interface of the application, a first query responsive to the trigger phrase. The data processing system can generate, via the natural language processor, a first response to the first query for input into the application. The data processing system can determine, based on execution of the application to process the first response, a state of the application. The data processing system can evaluate the state of the application to determine an error code. The data processing system can provide, to the application developer device, a notification based on the error code.

The data processing system can determine the parameter used by the application comprises an electronic account identifier. The data processing system can generate the first query comprising a request for the electronic account identifier. The data processing system can generate, via the natural language processor, the first response comprising a simulation value for the electronic account identifier.

The data processing system can prevent the application from executing the action of the application responsive to a value provided with the first response. The data processing system can determine the state of the application is a termination state. The data processing system can evaluate the state of the application to determine a resource utilized by the application is active. The data processing system can generate the error code indicating that the application failed to deactivate the resource responsive to the termination state.

The data processing system can determine the state of the application is a termination state. The data processing system can detect that a sensor utilized by the application is active. The data processing system can generate the error code indicating that the application failed to deactivate the sensor responsive to the termination state.

The data processing system can generate the first response based on a model trained with historical logs comprising responses detected by microphones of computing devices. The data processing system can select, based on a metric associated with a model trained with historical logs, one of the model or a predetermined response repository for generation of the first query. The data processing system can generate, based on the selection, the first response via the one of the model or the predetermined response repository.

The data processing system can establish, responsive to the first response, a telecommunication channel between a virtual client device and the application. The data processing system can provide, via the virtual client device and through the telecommunication channel, a second response to the application.

The data processing system can establish, responsive to the first response, a telecommunication channel between a device associated with the application developer and a virtual client device. The data processing system can provide, via the virtual client device and through the telecommunication channel, a second response to the device associated with the application developer.

The data processing system can establish, responsive to the first response, a telecommunication channel between a device associated with the application developer and a virtual client device. The data processing system can detect termination of the telecommunication channel. The data processing system can identify, responsive to termination of the telecommunication channel, a state of a microphone of the virtual client device. The data processing system can set the error code based on the state of the microphone of the virtual client device being active.

The data processing system can generate a second response based on a semantic analysis of the first response, the first query, and the trigger phrase. The data processing system can provide the second response for processing by the application executed by the data processing system.

The data processing system can identify a virtual client account. The data processing system can provide information associated with the virtual client account to the application to process the action of the application responsive to the first response.

The data processing system can identify a virtual client account. The data processing system can provide information associated with the virtual client account to the application to process the action responsive to the first response. The data processing system can block, responsive to detection of the virtual client account, execution of the action of the application by the application.

At least one aspect is directed to a method of validating actions in a digital assistant-based application. The method can include a data processing system identifying an application provided by an application developer device of an application developer. The application can include a conversational interface. The method can include the data processing system selecting, based on the application, an action from an action repository of the data processing system. The method can include the data processing system generating, via a natural language processor of the data processing system and based on the action and, a trigger phrase for input into the application. The method can include the data processing system executing the application to process the trigger phrase via the conversational interface. The method can include the data processing system identifying an action of the application responsive to the trigger phrase. The method can include the data processing system identifying a parameter used by the application to execute the action of the application. The method can include the data processing system generating, based on the parameter and via execution of the conversational interface of the application, a first query responsive to the trigger phrase. The method can include the data processing system generating a first response to the first query for input into the application. The method can include the data processing system determining, based on execution of the application to process the first response, a state of the application. The method can include the data processing system evaluating the state of the application to determine an error code. The method can include the data processing system providing, to the application developer device, a notification based on the error code.

The method can include the data processing system determining the parameter used by the application comprises an electronic account identifier. The data processing system can generate the first query comprising a request for the electronic account identifier. The data processing system can generate, via the natural language processor, the first response comprising a simulation value for the electronic account identifier.

The method can include the data processing system preventing the application from executing the action of the application responsive to a value provided with the first response. The method can include the data processing system determine the state of the application is a termination state. The method can include the data processing system evaluating the state of the application to determine a resource utilized by the application is active. The method can include the data processing system generating the error code indicating that the application failed to deactivate the resource responsive to the termination state.

The method can include the data processing system determining the state of the application is a termination state. The method can include the data processing system detecting that a sensor utilized by the application is active. The method can include the data processing system generating the error code indicating that the application failed to deactivate the sensor responsive to the termination state.

The method can include the data processing system generate the first response based on a model trained with historical logs comprising responses detected by microphones of computing devices.

The method can include the data processing system selecting, based on a metric associated with a model trained with historical logs, one of the model or a predetermined response repository for generation of the first query. The method can include the data processing system generating, based on the selection, the first response via the one of the model or the predetermined response repository.

The method can include the data processing system establishing, responsive to the first response, a telecommunication channel between a virtual client device and the application. The method can include the data processing system providing, via the virtual client device and through the telecommunication channel, a second response to the application.

The method can include the data processing system establishing, responsive to the first response, a telecommunication channel between a device associated with the application developer and a virtual client device. The method can include the data processing system providing, via the virtual client device and through the telecommunication channel, a second response to the device associated with the application developer.

The method can include the data processing system establishing, responsive to the first response, a telecommunication channel between a device associated with the application developer and a virtual client device. The method can include the data processing system detecting termination of the telecommunication channel. The method can include the data processing system identifying, responsive to termination of the telecommunication channel, a state of a microphone of the virtual client device. The method can include the data processing system setting the error code based on the state of the microphone of the virtual client device being active.

The method can include the data processing system generating a second response based on a semantic analysis of the first response, the first query, and the trigger phrase. The method can include the data processing system providing the second response for processing by the application executed by the data processing system.

The method can include the data processing system identifying a virtual client account. The method can include the data processing system providing information associated with the virtual client account to the application to process the action of the application responsive to the first response.

The method can include the data processing system identifying a virtual client account. The method can include the data processing system providing information associated with the virtual client account to the application to process the action responsive to the first response. The method can include the data processing system blocking, responsive to detection of the virtual client account, execution of the action of the application by the application.

A further aspect is directed to a computer-readable medium comprising instructions that, when executed by a computer, cause the computer to perform any of the methods disclosed herein. Another aspect is directed to a computer program comprising instructions that, when executed by a computer, cause the computer to perform any of the methods disclosed herein. It will be appreciated that features described in the context of one aspect can be implemented in the context of other aspects.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
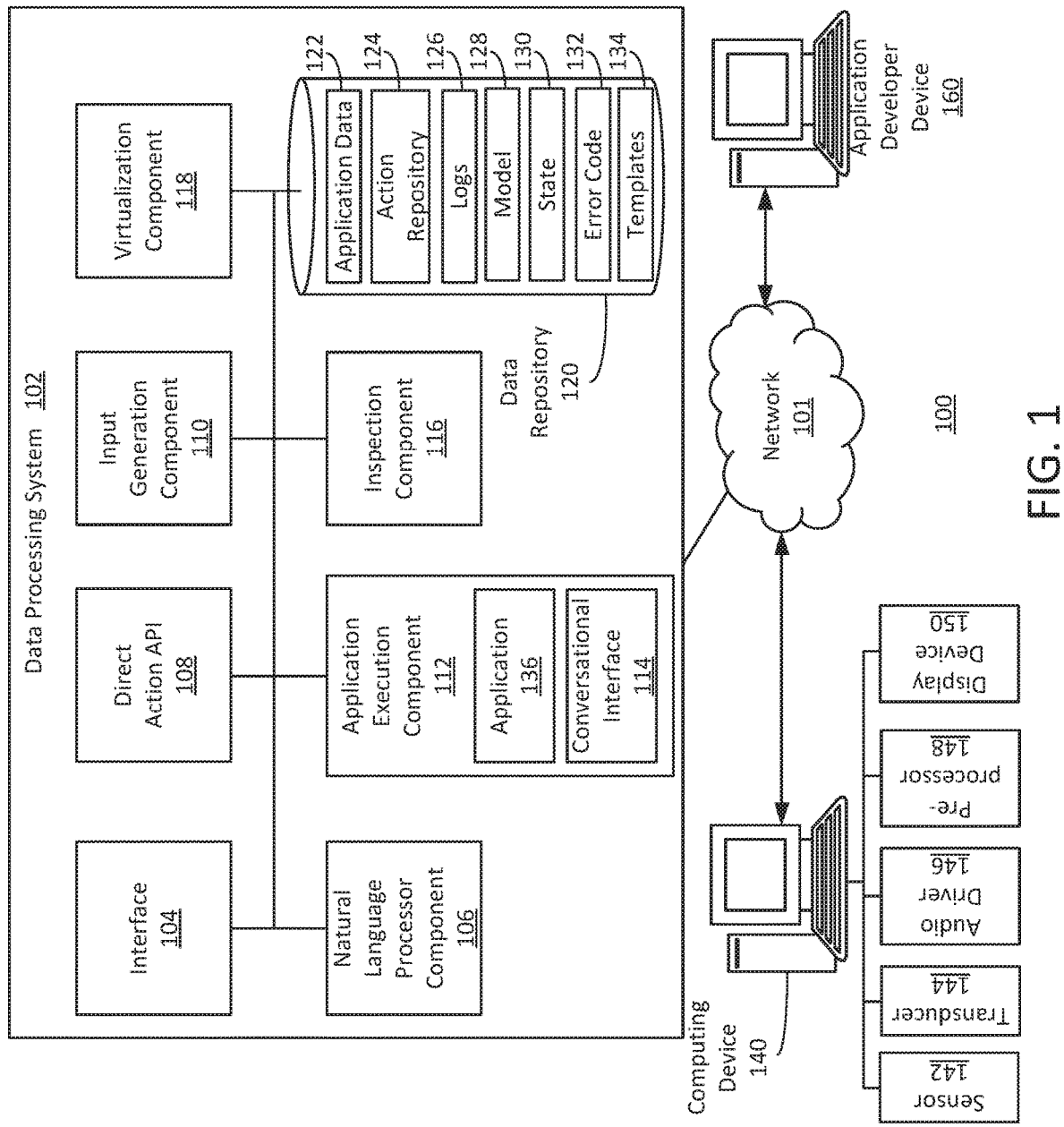
FIG. 1 is an illustration of an example system to validate actions in a digital assistant-based application.

Following below are more detailed descriptions of various concepts related to, and implementations of, methods, apparatuses, and systems of validating actions in a digital assistant-based application. The various concepts introduced above and discussed in greater detail below may be implemented in any of numerous ways.

This technology is generally directed to validating actions in a digital assistant-based application. The technology allows operation of a device under the control of an application to be simulated and for the application to be modified in response to the simulation. The modifications may, for example, modify how the application interacts with the device, for example modifying operation of the device under the control of the application. An application developer can develop an application. The application can include a conversational interface, or be configured to interface with a conversational interface. The application can receive commands to perform an action. For example, voice-based input can be processed by the conversational interface to identify an action and generate a command. However, due to the unstructured and varied nature of voice-based input, and the number of different available actions, it can be challenging to determine whether the application is performing the requested action. Further, an application may contain errors or bugs that result in faulty execution of the action. For example, the application can execute the action but fail to end a process or thread, or deactivate a sensor of the device, upon completion of the action. Due to the large number of applications and various actions configured on each, it can be challenging to efficiently and reliably evaluate each of the actions for each of the applications. Since an action can be triggered by numerous different conversational flows, it can be challenging to test all the different conversational flows to determine whether the actions they trigger are intended actions and are executed properly.

This technical solution is directed to validating or debugging applications with actions before the application is launched. A data processing system of this technical solution can simulate operation of a device running the application by automatically generating input that corresponds to a voice-based input that is provided to a conversational interface. The data processing system can trigger actions of the application, and automate a user interaction with a conversational interface. By doing so, the data processing system can identify errors with the execution of the action by the application and can take steps to modify the application in response to the identified errors.

The data processing system of the technical solution can provide a scalable platform that allows for the validation of actions executed by applications before the application is delivered to client computing devices for execution or otherwise launched. The data processing system can identify a predetermined list of action, items, or functions to test. The data processing system can simulate numerous user conversations (e.g., via a Monte Carlo simulation) to test each conversation flow. The data processing system can notify the developer of the results to allow the developer to update their application.

Thus, the data processing system of the technical solution can (i) perform pre-launch testing of applications to identify errors before the application is launched; (ii) test unstructured conversational flows by constructing input to drive a conversation; (iii) customize or tailor aspects of the conversation based on the application domain or type of application (e.g., different terms or vocabulary used for a movie ticket application, a navigation application, or a music streaming application); (iv) use a model generated based on historical conversations from actual users in order to simulate the conversation with an application by leveraging historical user conversations in an anonymous manner to generate input with intent; (v) use a classifier to determine a type of an action; and (vi) notify developers of the results of the review process responsive to receiving the application (e.g., within 5 or 10 minutes of receiving the application from the developer or a request from the developer to validate the application).

For example, the data processing system can test an action for an application used to provide a flower delivery service. The data processing system can generate a simulated voice input that triggers the application to identify and execute an application. The data processing system can execute the application to generate a response to the voice input. The data processing system can simulate a second voice input requesting to speak with customer service. The application can process the second voice input and establish a phone call between a customer service agent and a simulated or virtual user. The data processing system can terminate the call, and then determine the state of the application. The data processing system can determine whether processes, sub-processes, threads or sensors associated with the execution of the action by the application have been terminated or deactivated. If, for example, a sensor (e.g., a microphone) remained active or used by the application after the communication session was terminated, the data processing system can determine that the failure of the application to deactivate the sensor after termination of the session is an error or bug in the application. The data processing system can resolve the error or bug using one or more techniques, including, for example, applying a patch to the application to deactivate the sensor, blocking the application from delivery to client computing devices, removing the erroneous feature of the application, blocking the application from executing the actions, or notifying the developer of the error.

FIG. 1 illustrates an example system 100 to validate actions in a digital assistant-based application. The system 100 can include content selection infrastructure. The system 100 can include a data processing system 102. The data processing system 102 can communicate with one or more of an application developer device 160 or a computing device 140 via a network 101. The network 101 can include computer networks such as the Internet, local, wide, metro, or other area networks, intranets, satellite networks, and other communication networks such as voice or data mobile telephone networks. The network 101 can be used to access information resources such as web pages, web sites, domain names, or uniform resource locators that can be presented, output, rendered, or displayed on at least one computing device 140, such as a laptop, desktop, tablet, personal digital assistant, smart phone, portable computers, or speaker. For example, via the network 101 a user of the computing device 140 can access an application, information or data provided by an application developer device 160. The computing device 140 may or may not include a display; for example, the computing device may include limited types of user interfaces, such as a microphone and speaker. In some cases, the primary user interface of the computing device 140 may be a microphone and speaker.

The network 101 can include or constitute a display network, e.g., a subset of information resources available on the internet that are associated with a content placement or search engine results system, or that are eligible to include third party digital components as part of a digital component placement campaign. The network 101 can be used by the data processing system 102 to access information resources such as web pages, web sites, domain names, or uniform resource locators that can be presented, output, rendered, or displayed by the client computing device 140. For example, via the network 101 a user of the client computing device 140 can access information or data provided by the application developer device 160, or other service provider device or content provider device.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 101, for example with the computing device 140, or the application developer device 160 (or other service provider device or content provider device). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one application developer device 160. The application developer device 160 can include at least one logic device such as a computing device having a processor to communicate via the network 101, for example with the computing device 140 or the data processing system 102. The application developer device 160 can include at least one computation resource, server, processor or memory. For example, application developer device 160 can include a plurality of computation resources or servers located in at least one data center. The application developer device 160 can include one or more component or functionality of the data processing system 102.

The application developer device 160 can include a content provider device, or the content provider device can be separate from the application developer device 160. The data processing system 102 can communicate with a content provider device. The content provider computing device, or application developer device 160, can provide audio based digital components for display by the client computing device 140 as an audio output digital component. The digital component can include an offer for a good or service, such as a voice based message that states: "Would you like me to order you a taxi?" For example, the application developer device 160 can include memory to store a series of audio digital components that can be provided in response to a voice based query. The application developer device 160 can also provide audio based digital components (or other digital components) to the data processing system 102 where they can be stored in the data repository 120. The data processing system 102 can select the audio digital components and provide (or instruct the application developer device 160 to provide) the audio digital components to the client computing device 140. The audio based digital components can be exclusively audio or can be combined with text, image, or video data.

The application developer device 160 can include, interface, or otherwise communicate with a natural language processor component. For example, the application developer device 160 can provide an application having a conversational interface 114 that can include one or more component or functionality of the natural language processor component 106. The application developer device 160 can execute the conversational interface 114, or aspect thereof. The application developer device 160 can include or execute a natural language processor component 106, or aspect thereof. The application developer device 160 can include or execute a conversational interface 114, or aspect thereof.

The application developer device 160 can engage with the client computing device 140 (via the data processing system 102 or bypassing the data processing system 102) to create a back-and-forth real-time voice or audio based conversation (e.g., a session) between the client computing device 140 and the application developer device 160. The application developer device 160 can engage with the client computing device 140 via the NLP component 106, conversational interface 114 or other component. For example, the application developer device 160 can receive or provide data messages to the direct action API 108 of the data processing system 102. For example, the application developer device 160 can create, store, or make available digital components for a car sharing service, and the application developer device 160 (or a separate service provider device) can establish a session with the client computing device 140 to arrange for a delivery of a taxi or car of the car share service to pick up the end user of the client computing device 140. The data processing system 102, via the direct action API 108, the NLP component 106 or other components can also establish the session with the client computing device, including or bypassing the application developer device 160, to arrange for example for a delivery of a taxi or car of the car share service.

The application developer device 160 can include or refer to a provider of an application. The application developer device 160 can include or refer to an application developer device. The application developer device 160 can be a third-party provider device.

The computing device 140 can include, interface, or otherwise communicate with at least one sensor 142, transducer 144, audio driver 156, or pre-processor 148. The sensor 142 can include, for example, an ambient light sensor, proximity sensor, temperature sensor, accelerometer, gyroscope, motion detector, GPS sensor, location sensor, microphone, or touch sensor. The transducer 144 can include a speaker or a microphone. The audio driver 146 can provide a software interface to the hardware transducer 144. The audio driver can execute the audio file or other instructions provided by the data processing system 102 to control the transducer 144 to generate a corresponding acoustic wave or sound wave. The pre-processor 148 can be configured to detect a keyword and perform an action based on the keyword. The pre-processor 148 can filter out one or more terms or modify the terms prior to transmitting the terms to the data processing system 102 for further processing. The pre-processor 148 can convert the analog audio signals detected by the microphone into a digital audio signal, and transmit one or more data packets carrying the digital audio signal to the data processing system 102 via the network 101. In some cases, the pre-processor 148 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 140 can be associated with an end user that enters voice queries as audio input into the client computing device 140 (via the sensor 142) and receives audio output in the form of a computer generated voice that can be provided from the data processing system 102 (or the application developer device 160 or the application developer device 160) to the client computing device 140, output from the transducer 144 (e.g., a speaker). The computer generated voice can include recordings from a real person or computer generated language.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor component 106. The data processing system 102 can include, interface, or otherwise communicate with at least one direct action application programming interface ("API") 108. The data processing system 102 can include, interface, or otherwise communicate with at least one input generation component 110. The data processing system 102 can include, interface, or otherwise communicate with at least one application execution component 112.

The application execution component 112 can include a conversational interface 114. The data processing system 102 can include, interface, or otherwise communicate with at least one inspection component 116. The data processing system 102 can include, interface, or otherwise communicate with at least one virtualization component 118.

The data processing system 102 can include, interface, or otherwise communicate with at least one data repository 120. The at least one data repository 120 can include or store, in one or more data structures or databases, application data 122, an action repository 124, logs 126, a model 128, state information 130, or error codes 132. The application data 122 can include, for example, an executable file for the application, metadata about the application, content of the application, an application package file, transcript file, or other data associated with the application.

The action repository 124 can include predetermined actions. The action repository 124 can include preconfigured or default actions. The action repository 124 can include actions that the data processing system 102 (or direct action API 108) is configured to process. The action repository 124 can associate actions in a data structure based on a type of application or a domain of an application. Types of application can include, for example, lifestyle applications (e.g., fitness, dating, food, music, or travel), social media applications, utility applications (e.g., reminders, calculator, flashlight, weather), games or entertainment applications, productivity applications (e.g., word processing, spreadsheets, pay), or news or information applications. A domain of an application can include, for example, music streaming service, ride sharing service, ticket purchasing service, recipes or cooking. A domain can be a subset of a type of an applications. The action repository 124 can include a mapping of actions to types of applications or domains of applications. For example, an application having a type "music" or domain "music streaming service" can be associated with actions such as "play music", "pause music", "search for music by <artist_name>," or "play <song_name> on <device_name>."

The data repository 120 can include logs 126. Logs 126 can refer to or include historical network activity associated with one or more applications. Historical network activity can refer to or include network activity that occurred in the last 24 hours, 48 hours, 72 hours, 7 days, 30 days, 60 days or more. Network activity can include, for example, execution of an application, voice input received by an application, or application output. Logs can include voice input provided to one or more applications. Logs can be categorized based on features, such as type of application.

The data repository 120 can store a model 128. A model 128 can refer to a machine learning model that can be used to generate input, such as conversational input. The data processing system 102 can train the model 128 using logs 126. The model 128 can be used to construct sentences that can be input into the application. The model 128 can construct the input based on an action. For example, the model 128 can be trained to generate input based on types of actions to be executed by an application, or types of applications. The model 128 can be trained using logs 126 to generate input for different types of actions and applications. For example, the logs 126 can include historical input for different types of actions or different types of applications. The data processing system 102 can train the model 128 using the logs 126 for a type of action or application. The model 128 can generate a trigger phrase, query, response, or other input that can be provided to an application to execute an action.

The data repository 120 can include state information 130. State information 130 can refer to or include a state of an application or a status of an application. State information 130 can refer to or include a state or status of a process, thread, or sensor associated with or utilized by the application to execute an action or perform a function. For example, the state of the application can be active, standby, paused, or terminated. The state can further indicate a state within execution of the application, such as an initial screen, launch screen, initialization state, home screen, processing state, action querying state, semantic analyzing state, action lookup state, parameter request state, action execution state, communication session state, termination state, or other state in the application.

The data repository 120 can include error codes 132. The error codes 132 can include an identifier of a type of an error. The error codes 132 can include alphanumeric values, text, terms, strings, symbols, or other indications of an error or type of an error. For example, an error code 132 can refer to a failure of a sensor to deactivate, failure of an action to be completed, failure of the application to request a value of a parameter used to execute the action, failure of the application to execute the action using the parameter, or failure of the application to deactivate a microphone after termination.

The interface 104, NLP component 106, direct action API 108, input generation component 110, application execution component 112, conversational interface 114, inspection component 116, or virtualization component 118 can each include at least one processing unit or other logic device such as programmable logic array engine, or module configured to communicate with the database repository 120 or database. The interface 104, NLP component 106, direct action API 108, input generation component 110, application execution component 112, conversational interface 114, inspection component 116, virtualization component 118 and data repository 120 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 140. A user of a computing device 140 can affirmatively authorize the data processing system 102 to obtain network activity information corresponding to the user's computing device 140. For example, the data processing system 102 can prompt the user of the computing device 140 for consent to obtain one or more types of network activity information. The identity of the user of the computing device 140 can remain anonymous and the computing device 140 can be associated with a unique identifier (e.g., a unique identifier for the user or the computing device provided by the data processing system or a user of the computing device). The data processing system can associate each observation with a corresponding unique identifier.

The data processing system 102 can interface with a content provider or content provider device. The content provider device can be the application developer device 162. The content provider device can be a third party device different from the data processing system 102 and the application developer device 162. The content provider can establish an electronic content campaign. The electronic content campaign can be stored as content data in data repository 120. An electronic content campaign can refer to one or more content groups that correspond to a common theme. A content campaign can include a hierarchical data structure that includes content groups, digital component data objects, and content selection criteria. To create a content campaign, a content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the computing device 140. In some cases, an impression can refer to a viewable or audible impression; e.g., the digital component object is at least partially (e.g., 20%, 30%, 30%, 40%, 50%, 60%, 70%, or more) viewable on a display device 150 of the client computing device 140, or audible via a speaker (e.g., transducer 154) of the computing device 140. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can select the digital component objects when a content placement opportunity becomes available on the application provided by the application developer device 162, or responsive to a request for a digital component object made by the application. Different types of digital component objects can be included in a content group, such as a voice digital component, audio digital component, content item, a text digital component, an image digital component, video digital component, multimedia digital component, or digital component link. Upon selecting a digital component, the data processing system 102 can transmit the digital component object for rendering on a computing device 140 or display device 150 of the computing device 140. Rendering can include displaying the digital component on a display device 150, or playing the digital component via a speaker of the computing device 140. The data processing system 102 can provide instructions to a computing device 140 to render the digital component object. The data processing system 102 can instruct the computing device 140, or an audio driver 156 of the computing device 140, to generate audio signals or acoustic waves.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can facilitate communicating between one or more components of the data processing system 102.

The data processing system 102 can include an application, script or program installed at the client computing device 140, such as an app to communicate input audio signals to the interface 104 of the data processing system 102 and to drive components of the client computing device to render output audio signals. The data processing system 102 can receive data packets or other signal that includes or identifies an audio input signal. For example, the data processing system 102 can execute or run the NLP component 106 to receive or obtain the audio signal and parse the audio signal. For example, the NLP component 106 can provide for interactions between a human and a computer. The NLP component 106 can be configured with techniques for understanding natural language and allowing the data processing system 102 to derive meaning from human or natural language input. The NLP component 106 can include or be configured with technique based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 converts the audio input signal into recognized text by comparing the input signal against a stored, representative set of audio waveforms (e.g., in the data repository 120) and choosing the closest matches. The set of audio waveforms can be stored in data repository 120 or other database accessible to the data processing system 102. The representative waveforms are generated across a large set of users, and then may be augmented with speech samples from the user. After the audio signal is converted into recognized text, the NLP component 106 matches the text to words that are associated, for example via training across users or through manual specification, with actions that the data processing system 102 can serve.

The audio input signal can be detected by the sensor 142 or transducer 144 (e.g., a microphone) of the client computing device 140. Via the transducer 144, the audio driver 146, or other components the client computing device 140 can provide the audio input signal to the data processing system 102 (e.g., via the network 101) where it can be received (e.g., by the interface 104) and provided to the NLP component 106 or stored in the data repository 120.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request. In some cases, the trigger keyword can refer to or include a wakeup word, activation word or keyword that causes the computing device 140 to begin processing the input audio signal.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I need someone to do my laundry and my dry cleaning." The NLP component 106 can apply a semantic processing technique, or other natural language processing technique, to the data packets comprising the sentence to identify trigger phrases "do my laundry" and "do my dry cleaning". The NLP component 106 can further identify multiple trigger keywords, such as laundry, and dry cleaning. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "I", "could", "get", "someone", "that", "could", or "help". By filtering out these terms, the NLP component 106 may more accurately and reliably identify the trigger keywords, such as "go to the airport" and determine that this is a request for a taxi or a ride sharing service.

In some cases, the NLP component can determine that the data packets carrying the input audio signal includes one or more requests. For example, the input audio signal can include the sentence "I need someone to do my laundry and my dry cleaning." The NLP component 106 can determine this is a request for a laundry service and a dry cleaning service. The NLP component 106 can determine this is a single request for a service provider that can provide both laundry services and dry cleaning services. The NLP component 106 can determine that this is two requests; a first request for a service provider that performs laundry services, and a second request for a service provider that provides dry cleaning services. In some cases, the NLP component 106 can combine the multiple determined requests into a single request, and transmit the single request to an application developer device 160. In some cases, the NLP component 106 can transmit the individual requests to respective application developer devices 160 (or service provider devices or other third-party devices that can fulfill or execute an action), or separately transmit both requests to the same application developer device 160.

The data processing system 102 can include a direct action API 108 designed and constructed to generate, based on the trigger keyword, an action data structure responsive to the request. Processors of the data processing system 102 can invoke the direct action API 108 to execute scripts that generate a data structure to an application developer device 160 to request or order a service or product, such as a car from a car share service. The direct action API 108 can obtain data from the data repository 120, as well as data received with end user consent from the client computing device 140 to determine location, time, user accounts, logistical or other information to allow the application developer device 160 to perform an operation, such as reserve a car from the car share service. Using the direct action API 108, the data processing system 102 can also communicate with the application developer device 160 to complete the conversion by in this example making the car share pick up reservation.

The direct action API 108 can execute a specified action to satisfy the end user's intention, as determined by the data processing system 102. Depending on the action specified in its inputs, the direct action API 108 can execute code or a dialog script that identifies the parameters required to fulfill a user request. Such code can look-up additional information, e.g., in the data repository 120, such as the name of a home automation service, or it can provide audio output for rendering at the client computing device 140 to ask the end user questions such as the intended destination of a requested taxi. The direct action API 108 can determine necessary parameters and can package the information into an action data structure, which can then be sent to another component such as the application execution component 112 or to the application developer device 160 to be fulfilled.

The direct action API 108 can receive an instruction or command from the NLP component 106, or other component of the data processing system 102, to generate or construct the action data structure. The direct action API 108 can determine a type of action in order to select a template from the template repository 134 stored in the data repository 120. Types of actions can include, for example, services, products, reservations, or tickets. Types of actions can further include types of services or products. For example, types of services can include car share service, food delivery service, laundry service, maid service, repair services, or household services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The direct action API 108, upon identifying the type of request, can access the corresponding template from the template repository 134. Templates can include fields in a structured data set that can be populated by the direct action API 108 to further the operation that is requested of the application developer device 160 (such as the operation of sending a taxi to pick up an end user at a pickup location and transport the end user to a destination location). The direct action API 108 can perform a lookup in the template repository 132 to select the template that matches one or more characteristic of the trigger keyword and request. For example, if the request corresponds to a request for a car or ride to a destination, the data processing system 102 can select a car sharing service template. The car sharing service template can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 142 of the computing device 140 or a user interface of the computing device 140. For example, the direct action API 108 can detect the source location using a location sensor, such as a GPS sensor. The direct action API 108 can obtain further information by submitting a survey, prompt, or query to the end of user of the computing device 140. The direct action API can submit the survey, prompt, or query via interface 104 of the data processing system 102 and a user interface of the computing device 140 (e.g., audio interface, voice-based user interface, display, or touch screen). Thus, the direct action API 108 can select a template for the action data structure based on the trigger keyword or the request, populate one or more fields in the template with information detected by one or more sensors 142 or obtained via a user interface, and generate, create or otherwise construct the action data structure to facilitate performance of an operation by the application developer device 160.

The data processing system 102 can select the template based from the template data structure 134 based on various factors including, for example, one or more of the trigger keyword, request, application developer device 160, type of application developer device 160, a category that the application developer device 160 falls in (e.g., taxi service, laundry service, flower service, or food delivery), location, or other sensor information.

To select the template based on the trigger keyword, the data processing system 102 (e.g., via direct action API 108) can perform a look-up or other query operation on the template database 134 using the trigger keyword to identify a template data structure that maps or otherwise corresponds to the trigger keyword. For example, each template in the template database 134 can be associated with one or more trigger keywords to indicate that the template is configured to generate an action data structure responsive to the trigger keyword that the application developer device 160 can process to establish a communication session.

In some cases, the data processing system 102 can identify an application developer device 160 based on the trigger keyword. To identify the application developer device 160 based on the trigger keyword, the data processing system 102 can perform a lookup in the data repository 120 to identify a application developer device 160 that maps to the trigger keyword. For example, if the trigger keyword includes "ride" or "to go to", then the data processing system 102 (e.g., via direct action API 108) can identify the application developer device 160 as corresponding to Taxi Service Company A. The data processing system 102 can select the template from the template repository 134 (or template database) using the identify application developer device 160. For example, the template repository 134 can include a mapping or correlation between third party provider devices (e.g., application developer device) or entities to templates configured to generate an action data structure responsive to the trigger keyword that the application developer device 160 can process to establish a communication session. In some cases, the template can be customized for the application developer device 160 or for a category of application developer device 160. The data processing system 102 can generate the action data structure based on the template for the application developer device 160.

To construct or generate the action data structure, the data processing system 102 can identify one or more fields in the selected template to populate with values. The fields can be populated with numerical values, character strings, Unicode values, Boolean logic, binary values, hexadecimal values, identifiers, location coordinates, geographic areas, timestamps, or other values. The fields or the data structure itself can be encrypted or masked to maintain data security.

Upon determining the fields in the template, the data processing system 102 can identify the values for the fields to populate the fields of the template to create the action data structure. The data processing system 102 can obtain, retrieve, determine or otherwise identify the values for the fields by performing a look-up or other query operation on the data repository 120.

In some cases, the data processing system 102 can determine that the information or values for the fields are absent from the data repository 120. The data processing system 102 can determine that the information or values stored in the data repository 120 are out-of-date, stale, or otherwise not suitable for the purpose of constructing the action data structure responsive to the trigger keyword and request identified by the NLP component 106 (e.g., the location of the client computing device 140 may be the old location and not be the current location; an account can be expired; the destination restaurant may have moved to a new location; physical activity information; or mode of transportation).

If the data processing system 102 determines that it does not currently have access, in memory of the data processing system 102, to the values or information for the field of the template, the data processing system 102 can acquire the values or information. The data processing system 102 can acquire or obtain the information by querying or polling one or more available sensors of the client computing device 140, prompting the end user of the client computing device 140 for the information, or accessing an online web-based resource using an HTTP protocol. For example, the data processing system 102 can determine that it does not have the current location of the client computing device 140, which may be a needed field of the template. The data processing system 102 can query the client computing device 140 for the location information. The data processing system 102 can request the client computing device 140 to provide the location information using one or more location sensors 142, such as a Global Positioning System sensor, WIFI triangulation, cell tower triangulation, Bluetooth beacons, IP address, or other location sensing technique.

The direct action API 108 can transmit the action data structure to a third party provider device (e.g., application developer device 160) to cause the application developer device 160 to invoke a conversational application programming interface (e.g., service provider NLP component) and establish a communication session between the application developer device 160 and the client computing device 140. Responsive to establishing the communication session between the application developer device 160 and the client computing device 140, the application developer device 160 can transmit data packets directly to the client computing device 140 via network 101. In some cases, the application developer device 160 can transmit data packets to the client computing device 140 via data processing system 102 and network 101.

In some cases, the application developer device 160 can execute at least a portion of a conversational API or NLP component 106 (e.g., conversational interface 114). For example, the application developer device 160 can handle certain aspects of the communication session or types of queries. The application developer device 160 may leverage the NLP component 106 executed by the data processing system 102 to facilitate processing the audio signals associated with the communication session and generating responses to queries. In some cases, the data processing system 102 can include the conversational interface 114 configured for the application developer device 160. In some cases, the data processing system routes data packets between the client computing device and the third party provider device to establish the communication session. The data processing system 102 can receive, from the application developer device 160, an indication that the third party provider device established the communication session with the client device 140. The indication can include an identifier of the client computing device 140, timestamp corresponding to when the communication session was established, or other information associated with the communication session, such as the action data structure associated with the communication session.

In some cases, the conversational interface 114 can be a second NLP component that includes one or more component or function of the NLP component 106. The conversational interface 114 can interact or leverage the NLP component 106. In some cases, the system 100 can include a single NLP component 106 executed by the data processing system 102. The single NLP component 106 can support both the data processing system 102 and the third party application developer device 160. In some cases, the direct action API 108 generates or constructs an action data structure to facilitate performing a service, and the conversational API generates responses or queries to further a communication session with an end user or obtain additional information to improve or enhance the end user's experience or performance of the service.

The data processing system 102 can include, execute, or otherwise communicate with a content selector component to receive the trigger keyword identified by the natural language processor component 106 and select, based on the trigger keyword, a digital component via a real-time content selection process. The content selection process can refer to, or include, selecting sponsored digital component objects provided by third party content providers. The real-time content selection process can include a service in which digital components provided by multiple content providers are parsed, processed, weighted, or matched in order to select one or more digital components to provide to the computing device 140. The data processing system 102 can perform the content selection process in real-time. Performing the content selection process in real-time can refer to performing the content selection process responsive to the request for content received via the client computing device 140. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 140, or within a time interval after the communication session is terminated.

The data processing system 102 can select digital components for display in a voice-based environment, the data processing system 102 (e.g., via NLP component 106) can parse the input audio signal to identify keywords (e.g., a trigger keyword), and use the keywords to select a matching digital component based on a broad match, exact match, or phrase match. For example, the data processing system 102 can analyze, parse, or otherwise process subject matter of candidate digital components to determine whether the subject matter of the candidate digital components correspond to the subject matter of the keywords or phrases of the input audio signal detected by the microphone of the client computing device 140. The data processing system 102 may identify, analyze, or recognize voice, audio, terms, characters, text, symbols, or images of the candidate digital components using an image processing technique, character recognition technique, natural language processing technique, or database lookup. The candidate digital components may include metadata indicative of the subject matter of the candidate digital components, in which case the data processing system 102 may process the metadata to determine whether the subject matter of the candidate digital component corresponds to the input audio signal.

Content providers (e.g., application developer devices 160 or other third-party devices) may provide additional indicators when setting up a content campaign that includes digital components. The content provider may provide information at the content campaign or content group level that the data processing system 102 may identify by performing a lookup using information about the candidate digital component. For example, the candidate digital component may include a unique identifier, which may map to a content group, content campaign, or content provider. The data processing system 102 may determine, based on information stored in content campaign data structure in data repository 120, information about the content provider.

The data processing system 102 can receive, via a computer network, a request for content for presentation on a computing device 140. The data processing system 102 can identify the request by processing an input audio signal detected by a microphone of the client computing device 140. The request can include selection criteria of the request, such as the device type, location, and a keyword associated with the request. The request can include the action data structure or action data structure.

Responsive to the request, the data processing system 102 can select a digital component object from data repository 120 or a database associated with the content provider, and provide the digital component for presentation via the computing device 140 via network 101. The digital component object can be provided by a content provider device different from the application developer device 160. The digital component can correspond to a type of service different from a type of service of the action data structure (e.g., taxi service versus food delivery service). The computing device 140 can interact with the digital component object. The computing device 140 can receive an audio response to the digital component. The computing device 140 can receive an indication to select a hyperlink or other button associated with the digital component object that causes or allows the computing device 140 to identify a service provider, request a service from the service provider, instruct the service provider to perform a service, transmit information to the service provider, or otherwise query the application developer device 160.

The data processing system 102 can include, execute, access, or otherwise communicate with an input generation component 110 designed, constructed or operational to generate data packets for input into an application execution component 112. The input generation component 110 can include one or more component or functionality of the direct action API 108 or NLP component 106. The input generation component 110 can communicate or interface with the NLP component 106 or direct action API 108 to generate data packets, commands, instructions, or other data for input into the application execution component 112.

The input generation component 110 can identify an application provided by an application developer device 160 via network 101. The input generation component 110 can include an interface or port, or communicate via interface 104 of data processing system 102. The input generation component 110 can include or provide a graphical user interface for display to the application developer device 160. The input generation component 110 can receive a request or indication to generate an input. Responsive to receiving the request, the input generation component 110 can identify an application. The input generation component 110 can identify the application with or without receiving a request. For example, the input generation component 110 can determine to proactively identify an application, or identify the application based on a time interval, condition, event, or other process.

The input generation component 110 can receive a request to validate the application, and proceed with identifying the application or type of the application to generate an input responsive to the request to validate the application. The input generation component 110 can determine to validate the application responsive to receiving the application from the application developer device 160. The input generation component 110 can determine to validate the application responsive to determining that the application is being submitted to the data processing system 102 for delivery to client computing devices 140. The input generation component 110 can determine to validate the application before or prior to delivery of the application to a client computing device 140. The input generation component 110 can determine to block or prevent delivery of the application until the data processing system 102 has validated the application.

The input generation component 110 can identify the application based on an identifier of the application, name of the application, alphanumeric identifier, or other type of identifier. The input generation component 110 can identify the application based on an identifier of the application developer device 160. For example, the input generation component 110 can receive a request from the application developer device 160. The input generation component 110 can then perform a lookup in application data 122 in the data repository 120 to identify the application associated with the application developer 160.

The application identified by the input generation component 110 can include a conversational interface 114. For example, the application can be configured to use a conversational interface 114 or execute a conversational interface 114 or interact or communicate with a conversational interface 114. The application can include or use, as a user interface, a conversational interface 114. The application can obtain input and provide output via the conversational interface 114. The conversational interface 114 can include, utilize or otherwise interface with one or more component or functionality of the NLP component 106 or direct action API 108. The input generation component 110 can determine the application is configured with, or configured to use, the conversational interface 114. The input generation component 110 can determine the application includes or uses a conversational interface 114 based on a flag or tag associated with the application, parsing the application code, an application package file associated with the application, a transcript file, or other indication provided in the application data 122 in data repository 120.

The input generation component 110 can determine to validate the application. The input generation component 110 can determine to validate the application responsive to detecting or determining that the application includes or utilizes a conversational interface 114. The input generation component 110 can identify or determine a domain of the application.

The input generation component 110 can determine a type or domain corresponding to the application. For example, the input generation component 110 can determine a type or domain of the application. The input generation component 110 can determine within which domain or category the application belongs. The input generation component 110 can perform a lookup in the application data 122 to identify information about the application. The input generation component 110 can identify or determine information that facilitates generating input to provide to the application execution component 112. For example, the input generation component 110 can identify or determine a type of the application, domain of the application, historical network activity associated with the application, content of the applications, actions that the application is configured to execute, or inventory accessible by the application.

Types of application can include, for example, lifestyle applications (e.g., fitness, dating, food, music, or travel), social media applications, utility applications (e.g., reminders, calculator, flashlight, weather), games or entertainment applications, productivity applications (e.g., word processing, spreadsheets, pay), or news or information applications. A domain of an application can include, for example, music streaming service, ride sharing service, ticket purchasing service, recipes or cooking. A domain can be a subset of a type of an application.

The input generation component 110 can determine the type of the application or a domain of the application based on a lookup in the application data 122 repository or data structure. The input generation component 110 can determine the type or domain of the application based on parsing or other processing content associated with the application. For example, the application data 122 can include keywords, topics, terms, actions, inventory, entities, or other information associated with the application. The input generation component 110 can parse the keywords to determine the type or domain of the application. The input generation component 110 can be configured with a semantic processing technique that can determine, based on keywords or entities associated with the application, the type of application or domain of the application.

The input generation component 110 can determine the type or domain of the application based on historical network activity associated with the application or the application developer device 160. For example, the input generation component 110 can determine the type or domain of the application based on historical logs 126 associated with the application developer device 160. Logs 126 can include previous executions of actions or requests associated with the application developer device 160. The data processing system 102 can parse or process the logs 126 using semantic processing or other types of processing to determine a type or domain of the application.

The input generation component 110 can select an action from the action repository 124 stored in the data repository 120. The input generation component 110 can select the action based on the type or domain of the application. The input generation component 110 can, for example, perform a lookup in the action repository 124 to identify one or more actions that map to the type or domain of the application.

The action repository 124 can include or contain a mapping of domains or types to actions. The action repository 124 can associate types of applications with types of actions. For example, a ride sharing type of application can be associated with an action to order a ride; a news type of application can be associated with an action to provide latest news headlines for a geographic region; a weather type of application can be associated with an action to provide the weather forecast for a geographic region.

The input generation component 110 can select a predetermined action from the action repository 124 that maps to the type or domain of the application. For example, the action repository 124 can include multiple actions for each type or domain of applications. The action repository 124 can rank or order the actions. The action repository 124 can include a sequence of actions. An action can be associated with or include one or more parameters used to fulfill or execute an action.

The input generation component 110 can select a default or initial action for a type or domain of application. The input generation component 110 can select a first action from the action repository 124 based on the type or domain of the application. An initial or default action can be used to generate a trigger phrase for the application. For example, for a ride sharing type of application, an initial, default, or trigger action can include "order a ride"; for a ticket sales type of application an initial, default or trigger action can include "search for tickets for Artist_A."

The data processing system 102 can populate or update the action repository 124 based on identifying actions associated with types of applications. The data processing system 102 can identify similar applications and actions that the similar applications are configured to perform. Upon determining that the application can successfully execute or fulfill the action, the data processing system 102 can determine to update the action repository 124 with a mapping of the action to the type of application. In some cases, an administrator of the data processing system 102 can update or modify the action repository 124 to include new actions, or remove actions that are no longer performed by the type of application.

In some cases, the input generation component 110 can generate an action without selecting an action stored in the action repository 124. The input generation component 110 can receive a list of actions from the application developer device 160. For example, the application developer device 160 can provide a list of actions in an application package file or transcript file associated with the application. The data processing system 102 can parse the application package file or transcript file to identify actions established for the application. The input generation component 110 can select an action from the list of actions provided by the application developer device 160.

The input generation component 110 can generate a trigger phrase for input into the application. The input generation component 110 can automatically generate the trigger phrase. For example, the data processing system 102 itself can generate the trigger phrase for input into the application. The input generation component 110 can generate the trigger phrase using the NLP component 106. The input generation component 110 can generate the trigger phrase based on the selected action. The input generation component 110 can generate the trigger phrase to mimic, emulate, simulate, or represent a voice-based input that would be detected by a sensor 142 (e.g., microphone) of the computing device 140. The input generation component 110 can generate the trigger phrase to initiate execution of the action.

The data processing system 102 (e.g., the input generation component 110 or NLP component 106) can include a machine learning component or model 128 trained based on logs 126. The data processing system 102 can use the model 128 trained based on logs 126 to generate trigger phrases based on selected actions. The logs 126 can include historical trigger phrases detected by sensors 142 of computing devices 140 to initiate execution of an action for the application or other applications having the same type or domain as the application. The input generation component 110 can generate a trigger phrase that is configured to initiate execution of the action by the application via the conversational interface 114. The input generation component 110 can construct the trigger phrase for input into the application via the conversational interface 114 of the application.

For example, for an action to order a ride for a ride sharing type application, the input generation component 110 can generate trigger phrases such as: "I would like to get a ride to work," "I need a ride to the movie theater on Main Street," "How much is a ride to go home?" The input generation component 110 can use natural language processing (e.g., via NLP component 106) to generate various types of trigger phrases to initiate execution of an action for the type of application.

The input generation component 110 can construct a sentence as the trigger phrase. The input generation component 110, using the NLP component 106, can construct a sentence for the selected action. The input generation component 110 can construct the sentence with a noun and verb. The input generation component 110 can construct the sentence with a request for the action. For example, the NLP component 106 can include a natural language generator. The input generation component 110, using a natural language generator of the NLP component 106, can generate natural language from structured data such as a knowledge base or a logical form (e.g., linguistics). The input generation component 110 can construct terms, phrases or sentences that initiate execution of the action or facilitate execution of fulfillment of the action. The sentence or trigger phrase generated by the input generation component 110 can include an indication of the selected action. The sentence or trigger phrase generated by the input generation component 110 can include an indication of the application. For example, the trigger phrase can include "Use Application_A to play music from playlist Number_1."

To do so, the input generation component 110 can use one or more natural language generation techniques. The input generation component 110 can access a list of predetermined text (e.g., a predetermined response repository) that is copied and pasted, possibly linked with other text. The input generation component 110 can generate the phrase in stages of planning and merging of information to allow for the generation of text that looks natural and does not become repetitive. For example, the input generation component 110 can generate the trigger phrase or additional phrases based on the action using one or more of the following stages: content determination to identify what information to mention in the phrase; document structuring to organize the information to convey; aggregation to merge similar terms, phrases or sentences to improve readability and naturalness; lexical choice to putting words to the concepts; referring expression generation to create referring expressions that identify objects and regions; and realization to creating the actual text, which can be in accordance with the rules of syntax, morphology, and orthography.

The input generation component 110 can use machine learning to build a system, without using the separate stages as above. For example, the input generation component 110 can use a model trained by a machine learning engine (e.g., an artificial recurrent neural network such as long short-term memory) on a large data set of input data (e.g., logs 126) and corresponding (human-written) output texts. Thus, the input generation component 110 can use one or more techniques to generate a trigger phrase for input into the application based on the selected for the application action.

The input generation component 110 can determine which technique to use to construct or generate sentences, text, phrases, or responses. The input generation component 110 can evaluate a quality of the model 128 to determine whether the model 128 has been sufficiently trained to generate phrases. The input generation component 110 can determine a metric of the model 128 which can indicate a quality of the model 128. The metric can correspond to an amount of logs 126 used to train the model 128, a confidence score associated with the model 128, a quality of sentences constructed using the model 128, or other quality indicator. Based on the metric associated with the model trained with historical logs 126, the inspection component 116 can select one of the model 128 or a predetermined response repository to use to generate queries. The input generation component 110 can generate, based on the selection, the response via the one of the model 128 or the predetermined response repository (e.g., stored in the action repository 124, application data 122, or template 134).

The input generation component 110 can simulate an intent based on a context, such as the action. The input generation component 110 can simulate an intent based on a previous context in the conversation. For example, if a previous action was to place an order for an item, then the input generation component 110 can generate a subsequent phrase such as "What is the status of my order?", "Has my order been shipped?", "When will my order arrive?", "How much was my order?" The input generation component 110 can establish a conversation with the application 136 via the conversational interface 114.

The input generation component 110 can determine to omit certain information from the trigger phrase or other sentence or phrase that is to be input into the application 136 executed by the application execution component 112. The input generation component 110 can determine to omit values for parameters used to execute the selected action. For example, an action to order a ride can include parameters pick up destination and drop off destination. The input generation component 110 can generate the trigger phrase by omitting the drop off destination as follows "I would like to order a ride to go somewhere." The input generation component 110 can be configured to include values for parameters or omit values for parameters to cause the application 136 executed by the application execution component to generate queries via a conversational interface 114 to request the values for the parameters that were omitted by the input generation component 110.

The data processing system 102 can include, access or otherwise interface with an application execution component 112. The application execution component 112 can be designed, constructed or operational to execute an application 136 provided the application developer device 160. The application execution component 112 can execute the application 136 on the data processing system 102. The application execution component 112 can execute the application 136 in a sandboxed environment on the data processing system 102. A sandboxed environment can refer to executing the application 136 in a computing environment or memory that has restricted access to other memory, components or functionality of the data processing system 102. The application 136 executed in the sandboxed environment can be restricted from accessing components or functionality of the data processing system 102 that is external or outside the sandboxed environment. The sandbox environment can isolate the application being executed from other components, functionality or resources of the data processing system 102. The sandbox environment can provide a secure environment in which to execute the application 136 such that erroneous functionality in the application may not negatively impact other components of the data processing system 102.

The application execution component 112 can execute the application 136 in a virtual machine. For example, the application execution component 112 can invoke a virtual machine that executes the application. The application execution component 112 can instantiate a virtual machine or instance of the application executing on the data processing system 102 by a virtual machine. The application execution component 112 can configure or establish the virtual machine using one or more configuration parameters. The configuration parameters can be stored in the application data 122. For example, the application developer device 160 can indicate a software or hardware configuration for the execution of the application. The application developer device 160 can indicate the types of software or hardware with which the application is compatible. The application execution component 112 can obtain the configuration from the application data 122, and configure the virtual machine based on the configuration information so that the virtual machine can execute the application. For example, the virtual machine can be configured with a type of processor (e.g., processor frequency, cores, speed, performance) or amount of memory that is comparable to a computing device 140 that would execute the application 136.

The application execution component 112 can execute the application 136 with a conversational interface 114. The application execution component 112 can use the conversational interface to provide input to the application, and present output from the application. The application 136 can access a network (e.g., network 101) to request other input, or transmit output. The application execution component 112 can provide the conversational interface 114 to simulate providing voice input generated by the input generation component 110 to the application being executed via the application execution component 112 (e.g., a virtual machine invoked by the application execution component 112).

The application execution component 112 can receive the trigger phrase generated by the input generation component 110 and provide the trigger phrase to the application 136 executed by the application execution component 112. The input generation component 110 can provide the trigger phrase to the interface 104, which can forward the trigger phrase to the conversational interface 114 of the application. The conversational interface 114 can be executed by the application 136, or the application 136 can utilize the NLP component 106 to parse and process the trigger phrase.

The application 136 can parse or process the trigger phrase to identify an action. The trigger phrase can refer to an initial phrase or a first phrase or query used to launch or command the application. The trigger phrase can include, for example, "Order a ride to Restaurant_A." The application execution component 112 can execute the application in a manner similar to a client computing device 140 executing the application 136. For example, the application 136, executed by the application execution component 112, can process the trigger phrase to identify an action. The action can be the same or similar action previously selected by the input generation component 110 to generate the trigger phrase.

The application 136 can identify a parameter used to execute the action. The application 136 can access a data repository of the application, or other memory, index, or data file of the application 136 to identify the parameter. In some cases, the application 136 can make a remote procedure call to the data processing system 102, or one or more component thereof, to further process the action. The application 136 can make a remote procedure call to the application developer device 160 to further process the action or trigger phrase.

The application 136 can identify one or more parameters used to execute the action identified in the trigger phrase. The application 136 can identify the parameter from the action repository 124. For example, the action repository 124 can include a mapping of parameters to actions. The action repository 124 can include an association between actions and parameters used to fulfill the action. The application developer 160 can establish a data structure for the application 136 that indicates which parameters are used by the application 136 to fulfill the action. Parameters can include any type or form of parameter or value that facilitates executing or fulfilling the action. For example, parameters for a ride sharing action can include: pick up location, drop off location, number of passengers, pick up time, drop off time, or type of vehicle. Parameters for a play music action can include: artist name, song name, album name, playlist name, or radio station name. Parameters for an action to purchase a ticket can include: venue name, act, artist, sport, sports teams names, date, number of tickets, price, or seat location.

The application execution component 112 can execute the application 136 to identify one or more parameters and then generate a query based on the identified parameters. For example, the application 136, responsive to receiving the trigger phrase, can identify the action and parameters used to execute the action. The application 136 can determine that values for the identified one or more parameters are missing, unavailable or otherwise not provided with the trigger phrase. For example, the trigger phrase generated by the input generation component 110 may include a request to order a ride, but lack the drop off or pick up location for the ride.

The application 136 can determine to generate a query to obtain a value for a parameter used to execute the action. The application 136, executed by the application execution component 112 of the data processing system 102 (e.g., in a sandbox computing environment of the data processing system 102 or virtual machine), can generate a query based on the parameter. The application 136 can generate the query using the conversational interface 114 of the application. The conversational interface 114 can be provided by one or more component of the data processing system 102. The application 136 can generate the query using the conversational interface 114, which can use the NLP component 106 or input generation component 110.

In response to an action to request an action that lacks a value for a parameter used to execute the action, the application 136 can generate a query to obtain the value for the parameter in order to facilitate executing the action. The application 136 can generate the query in a conversational form in accordance with the conversational interface 114. For example, a value of a parameter used to execute an action can be absent from the trigger phrase or other input phrase. The application 136 can generate a query to request the value of the parameter used to execute the action. For example, if the action is to order a ride and a value for the destination parameter was missing from the trigger phrase or other input phrase, the application 136 can generate a query "Where would you like to go?", "What is the destination?", "Sure, I can request a ride for you. What is the drop off location?"

The application 136, via the conversational interface 114, can provide the generated query requesting values for parameters used to execute the action. The data processing system 102, via input generation component 110, can generate a response to the query. The response can include the requested value for the parameter used to execute the action. The input generation component 110 can generate the response with the value. The input generation component 110 can use a natural language generator to generate the response with the value. The input generation component 110 can identify any value in accordance with the parameter. The input generation component 110 can access a structured database with entities to select the value. The input generation component 110 can access a predetermined list of values for parameters (e.g., in action repository 124 of application data 122). The input generation component 110 can identify or select a value for the parameter from logs 126.

The application 136 can receive the response to the query containing the value for the parameter. The application 136 can execute the action using the value for the parameter. In some cases, the application 136 can generate additional queries for additional values for additional parameters. The input generation component 110 can generate additional responses with values for the requested parameters. The application 136 can provide the queries via conversational interface 114 to a component of the data processing system 102, and receive responses to the queries via the conversational interface 114 from a component of the data processing system 102. The application 136 can proceed to execute the action and fulfill the action. The application 136 can populate an action data structure (e.g., using a component or functionality of direct action API 108) for the action with one or more values for one or more parameters, and process or transmit the action data structure to fulfill the request for the action.

The input generation component 110 can generate one or more responses. The input generation component 110 can generate additional responses responsive to additional queries from the application 136. The input generation component 110 can generate a second response based on a semantic analysis of a first response, a first query from the application, and a trigger phrase. The input generation component 110 can provide the second response for processing by the application 136 executed by the data processing system 102. Thus, the data processing system 102 can conduct a conversation with multiple responses and queries between the application 136 and one or more components of the data processing system 102. The conversation can include the execution of one or more actions.

The data processing system 102 can include, execute, or otherwise interface with a virtualization component 118. The virtualization component 118 can be designed, constructed or operational to simulate interactions between the application 136 executed via the application execution component 112 and a virtual computing device. The virtual computing device can emulate or represent a client computing device 140. The virtualization component 118 can simulate or emulate an application developer device 160. The virtualization component 118 can emulate or simulate a content provider, service provider, or other third party provider device.

The virtualization component 118 can simulate a client computing device 140. The virtualization component 118 can provide an electronic account used to simulate a user of a client computing device 140. The virtualization component 118 can provide an electronic account used to simulate a third party service provider. The virtualization component 118 can include virtual accounts that include, for example, usernames, identifiers, preferences, location information, financial account information, or other information used by an application 136 to execute an action. The virtualization component 118 can allow the application 136 executed by the application execution component 112 to execute the action as if the application 136 was executing the action on a client computing device 140.

For example, application 136 executed by the application execution component 112 can execute the action with one or more values for one or more parameters. The application can execute the action by transmitting an action data structure (e.g., generated using one or more functionality of the direct action API 108). The application 136 may attempt to transmit the action (e.g., an action to order a ride) to a third party service provider that provides the ride. The application execution component 112 can intercept the request. The application execution component 112 can include a hooking component configured to intercept and redirect the request. The application execution component 112 can receive data packets corresponding to the action data structure, and modify a destination address of the data packets to prevent the data packets from being sent to a third party service provider.

The virtualization component 118 can provide a virtual user account and virtual service provider account. The virtualization component 118 can allow the application 136 to establish a telecommunication channel between a device associated with the application developer device 160 and a virtual client device provided by the virtualization component 118. The virtualization component 118 can provide virtual user account information to the device (e.g., a service provider) associated with the application developer device 160. The data processing system 102 (e.g., input generation component 110), using the virtualization component 118, can provide responses to the device associated with the application developer device 160.

The data processing system can establish a telecommunication channel between a virtual client device and the application or a device associated with the application developer device 160. The input generation component 110 can generate input to transmit via the telecommunication channel to the application or the application developer device 160. The input can include a response to a query or other input, such as phrases, trigger phrases, or values for parameters to execute an action. The telecommunications channel can refer to an audio communication channel, chat communication, SMS text communication, cellular based communication, phone call, or voice over internet protocol. For example, the application c136 n include a chat bot, and the input generation component 110 can establish a telecommunication channel with the chat bot of the application.

For example, the application 136 can determine that the parameter used by the application is an electronic account identifier. The application 136 can generate a query with a request for the electronic account identifier. The application 136 can generate the query via the conversational interface 114. The virtualization component 118 can receive the query. The virtualization component 118 (e.g., via the NLP component 106 or the input generation component 110) can generate a response that includes a simulation value for the electronic account identifier. The simulation value can refer to a virtual electronic account. The virtual electronic account can be a test account or account associated with an administrator of the data processing system 102 or application developer device 160. The virtual account may include values for parameters that do not correspond to an actual user of the application 136 or client computing device 140. The virtual account can be established by the virtualization component 118, an administrator, or the application developer to facilitate evaluating the application 136.

The virtualization component 118 can provide a flag, indication, or value for input into the application 136 that is a simulated value or value for a virtual account. A simulated value can indicate that the value does not correspond to an actual user. The simulated value can indicate to the application execution component 112 that the application 136 cannot execute an aspect of the action. The application execution component 112 can determine, based on detected the simulated value or virtual value, to prevent or block the application 136 from executing the action with the simulated value. For example, the simulated value may be a financial account identifier and there may not be an actual financial account with funds corresponding to the simulated value. Thus, the application execution component 112, upon detecting the simulated value, can block or prevent execution of the portion of the action that entails transferring funds from the simulated financial account. In another example, simulated values for a ride sharing action can include pickup and drop off locations, in which case the application execution component 112 (e.g., via virtualization component 118), can prevent the application 136 from ordering an actual service provider to fulfill the ride request.

The application execution component 112 can determine that the value provided by the input generation component 110 or virtualization component 118 is a simulated value based on flag, tag, indication or symbol associated with the value. In some cases, the application execution component 112 can determine that certain parameters may have values that are virtual values, and block execution of aspects of actions that utilize such parameters (e.g., financial account identifier, or pickup or drop off locations).

The virtualization component 118 can utilize interface 104 and network 101 to allow the application 136 to establish telecommunication channels, links or sessions with devices external to the data processing system 102. The virtualization component 118 can, in some cases, simulate a telecommunication channel, link or session such that the application 136 executed by the application execution component 112 can continue to process and execute the action from the sandboxed computing environment. In some cases, the virtualization component 118 can receive requests from the application 136 and transmit responses to the application 136 via conversational interface 114. For example, the virtualization component 118 can utilize one or more component or functionality of the NLP component 106 or input generation component 110 to communicate with application 136 executed by application execution component 112.

The application 136 may or may not successfully execute the action with the values. The application 136 may or may not successfully request values for parameters used to execute the action. For example, the application 136 may fail to request a value for a parameter that is used to execute the action. The application 136 may proceed to execute the action without the value for the parameter, which may result in erroneous execution of the action, unsuccessful fulfillment of the action, or the application 136 crashing, freezing, or terminating.

The data processing system 102 can include, execute, or otherwise interface with an inspection component 116. The inspection component can be designed, constructed or operational to validate the application 136. The inspection component 116 can determine a state of the application 136 executed by the application execution component 112. The inspection component 116 can evaluate the state of the application 136. The inspection component 116 can identify an error code based on the state of the application 136. The inspection component 116 can provide a notification to the application developer device 160 based on the error code.

The inspection component 116 can validate the application. Validation can refer to or include determining that the application passes certain tests performed by the data processing system 102. Validation can refer to or include determining that the application does not include errors or bugs (e.g., does not crash or freeze during certain actions). Validation can refer to or include confirming that the application can execute an action or fulfill an intent. Validation can refer to or include determining that the application does not consume excessive computing resources (e.g., memory, processor utilization, network bandwidth, remote procedure calls, storage, audio output, or screen display brightness level). The data processing system 102 can validate the application if the application can perform an action without consuming an amount of a computing resource that is greater than or equal to a computing resource threshold. The threshold can be a dynamic threshold, percentage, ratio, or absolute threshold. The threshold can vary based on the type of application, operating system with which the application is compatible, or device configuration associated with the application. Thus, the data processing system 102 can validate the application based on various factors.

The inspection component 116 can determine whether the application 136 has crashed or is in a frozen state. The inspection component 116 can determine that the application has crashed if the application 136 has become non-responsive. For example, the inspection component 116 can access a task manager of the application execution component 112 or virtual machine executing the application 136 to determine whether a state of a process associated with the application 136 is running, unresponsive, suspended, or terminated. If the application 136 state is unresponsive, the inspection component 116 can evaluate the unresponsive state to determine that the application 136 failed to execute the action. The inspection component 116 can determine an error code corresponding to failure to execute the action. The error code can include an alphanumeric code, text, terms, phrases, symbol, or other indication of the error. The inspection component 116 can retrieve the error code from the error code repository 132 stored in data repository 120. The error code repository 132 can include an index or mapping of application states or conditions associated with application states to error codes.

The inspection component 116 can determine the state of the application 136 by evaluating an output of the application 136. The inspection component 116 can parse an output of the application 136. The inspection component 116 can obtain, receive or identify the output of the application 136 via conversational interface 114. The inspection component 116 can obtain the output of the application via the virtualization component 118. For example, the application 136 can provide audio or visual output for presentation via a client computing device 140. However, since the application 136 can be executed by the application execution component 112 for validation purposes, the application execution component 112 can forward the output to the virtualization component 118. The inspection component 116 can parse the visual output or analyze the audio output to determine a state of the application 136. For example, the visual output can include an error message, such as an error pop-up window, or a blank screen indicating an error. The audio output can indicate an error or frozen state of the application 136. The visual or audio output of the application 136 can otherwise indicate a state of the application. The visual or audio output of the application 136 can indicate that the application 136 successfully executed the application 136.

For example, if the application 136 is a ride sharing application, the inspection component 116 can determine whether the output of the application indicates that a ride is being requested or ordered. The inspection component 116 can further determine whether the values for the parameters input to the application 136 were properly used to execute the action. The inspection component 116 can parse the output of the application 136 to determine that the pickup location or drop-off location correspond to the values of the parameters that were input into the application 136 via the conversational interface 114.

The inspection component 116 can determine whether the application 136 requested values for all parameters used to execute the action. The inspection component 116 can determine, via action repository 124, the parameters that are used to execute the action. The inspection component 116 can validate whether the application 136 generated one or more queries to obtain values for the parameters used to execute the action prior to executing the action. If the inspection component 116 determines that the application 136 failed to request values for parameters used to execute the action, but proceeded to execute the action with missing parameters, the inspection component 116 can determine that the application 136 erred or failed to obtain values for the parameters. The inspection component 116 can determine the state of the application to be a failure state or unsuccessful state. The inspection component 116 can select an error code for this state that indicates that the application 136 failed to request values for parameters used to perform the action. The error code can indicate that the application 136 attempted to execute an action with missing values or partial data. The inspection component 116 can determine that executing the action with missing values may not be successful or result in the inefficient execution of the action, thereby consuming excessive computing resources.

For example, an action to order a ride can include parameters for pick up location, drop off location, and electronic account identifier. The application 136 may request values for the pickup and drop off locations, but fail to obtain an electronic account identifier. The application 136 can proceed to attempt to execute the action with requested the electronic account identifier. However, this may be inefficient or result in a failure mode because the application 136 may be unable to obtain payment information for the ride, or validate the user. Accordingly, the inspection component 116 can evaluate the state by identifying the values for parameters the application 136 requested, the type of action, and the state of the application 136 to determine that the application 136 attempted to execute the action with a missing value. The inspection component 116 can evaluate this state of the application to determine an error code that indicates the application 136 failed to request values for parameters used to execute the action.

In some cases, the inspection component 116 can evaluate the state prior to execution of the action to determine that a value for a parameter is missing and that the application 136 failed to request the value, and then prevent the application from executing the action.

The inspection component 116 can evaluate resource consumption of the application 136 of the prior to, during, and subsequent to execution of the action. The inspection component 116 can use a task manager or other utility to monitor processor utilization, memory utilization, input/output reads, data storage read/writes, network bandwidth utilization, or other computing resource metrics. The inspection component 116 can evaluate this metrics on the virtual machine executing the application 136, or other component or system that executes the application 136. The inspection component 116 can evaluate the state of the application 136 based on the computing resource consumption metrics. The inspection component 116 can compare the computing resource consumption metrics with a threshold (e.g., a threshold stored in the error code 132 repository) to determine an error code. If a resource consumption metric is greater than or equal to a threshold, the inspection component 116 can assign an error code that indicates which resource consumption metric was greater than or equal to the threshold. The inspection component 116 can select error codes that can indicate the application 136 consumed excessive computing resources before execution of the action, during execution of the action, or subsequent to execution of the action.

The inspection component 116 can evaluate the state of the application 136 based on sensor utilization. The inspection component 116 can evaluate which sensors the application 136 utilizes to execute the action. The inspection component 116 can determine whether the sensor is still active upon completion of the action or termination of the application 136. The inspection component 116 can determine whether the application 136 is unnecessarily keeping a sensor active. The inspection component 116 can determine whether the application 136 failed to deactivate a sensor. The inspection component 116 can determine whether sensors are active or inactive via the virtualization component 118. The inspection component 116 can determine whether sensors are being used by the application 136 based on commands or communications provided by the application 136. The inspection component 116 can determine what ports the application 136 may be using to communicate with a sensor. Example sensors can include sensors 142, such as a microphone, speaker, ambient light sensor, temperature sensor, accelerometer, gyroscope, or other sensor.

For example, the application 136 can utilize a microphone to establish a voice-based communication channel, such as a telephone call, with a device of the application developer device 160. The application 136 can terminate or end the telephone call. The inspection component 116 can determine whether the microphone has been deactivated subsequent to termination of the telephone call. The inspection component 116 can evaluate the state of the application 136 to determine that the application 136 failed to deactivate the microphone upon termination of the phone call, and then determine an error code that indicates the application 136 failed to deactivate the microphone. For example, the data processing system 102 can determine the state of the application is a termination state. The data processing system 102 can evaluate the state of the application to determine a resource (e.g., memory, processor, display, speaker, input device) or sensor (e.g., microphone or ambient light sensor) utilized by the application is active. The data processing system 102 can generate the error code indicating that the application failed to deactivate the resource or sensor responsive to the termination state.

For example, the application 136 can establish a telecommunication channel between a device associated with the application developer and a virtual client device (e.g., provided by virtualization component 118). The telecommunication channel can be established responsive to a request or response provided by the input generation component 110 via conversational interface 114. For example, the input generation component 110 can request to speak with a technical support agent, salesperson, or customer service representative of the application developer. The input generation component 110 can automatically generate and provide input to initiate this request. The application 136, responsive to the request, can establish the telecommunications channel. The inspection component 116 can detect termination of the telecommunication channel. For example, the input generation component 110 can provide input to hang up the phone call. Responsive to termination of the telecommunication channel, the inspection component 116 can identify a state (e.g., active or inactive) of a microphone of the virtual client device. The data processing system 102 can set an error code based on the state of the microphone of the virtual client device being active. The error code can indicate that the application 136 failed to deactivate the microphone upon termination of the telephone call.

Figure 2:
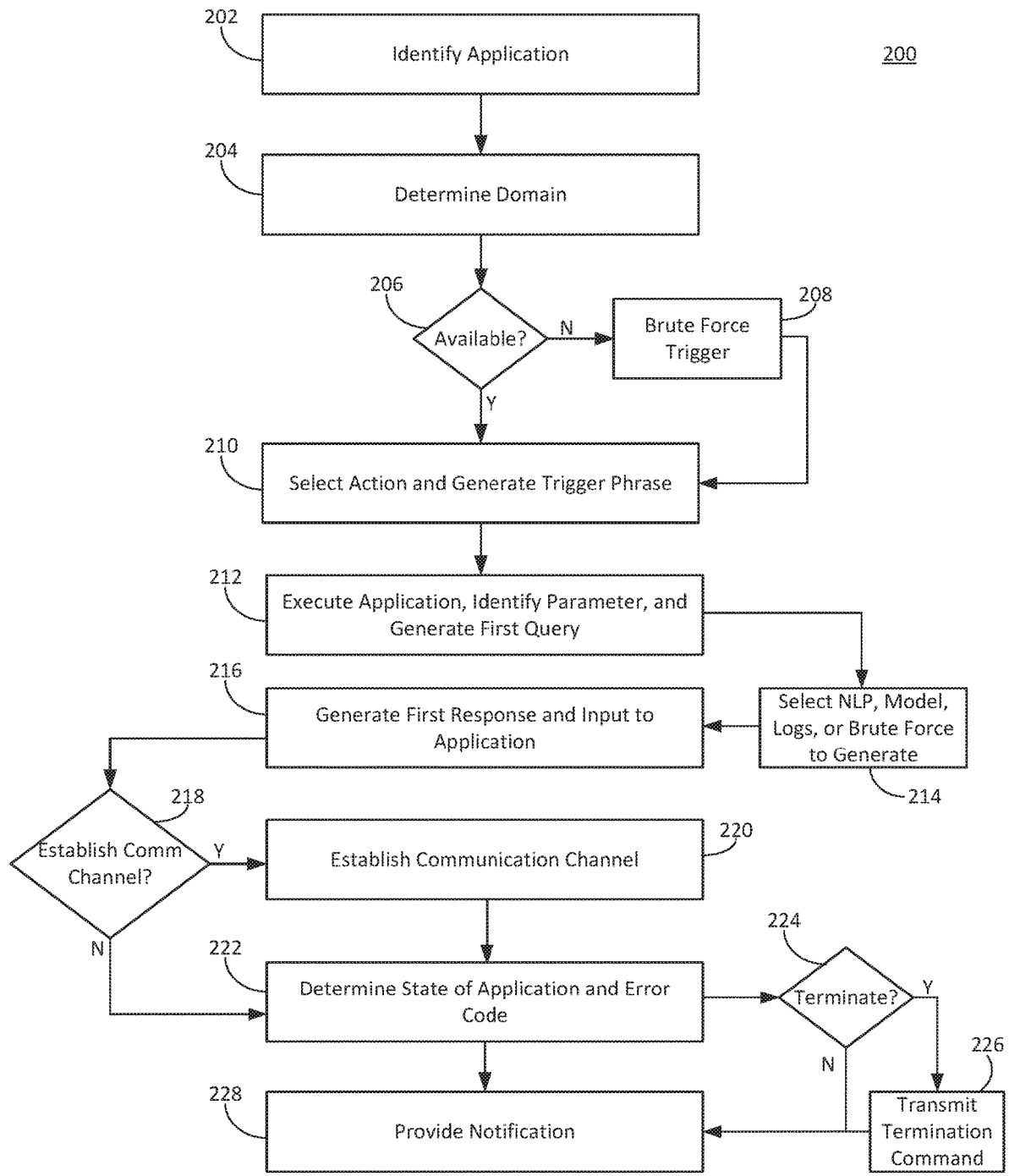
FIG. 2 is an illustration of a method of validating actions in a digital assistant-based application.

FIG. 2 is an illustration of a method of validating actions in a digital assistant-based application. The method 200 can be performed by one or more component or system depicted in FIG. 1 or FIG. 3, including, for example, a data processing system. At 202, the data processing system can identify an application. The data processing system can identify the application responsive to a request to validate an application. The application can be provided by an application developer device of an application developer. The application can include or utilize a conversational interface for input or output. The data processing system can identify the application based on detecting that the application has not yet been launched (e.g., not yet live on an online application store for delivery to client computing devices). The data processing system can identify the application is a new application, or a new version of a previously provided application. The data processing system can identify the application has not yet been validated, evaluated, or tested. The data processing system can identify that a previous version of the application failed an evaluation or did not pass a validation process. The data processing system can determine, based on the previous version failing, to validate the newly submitted version.

At 204, the data processing system can determine a domain of the application. The data processing system can determine a type or domain of the application, such as music streaming or ride sharing. The data processing system can use various techniques to identify the type or domain of the application, including, for example, parsing metadata associated with the application, accessing an online resource associated with the application developer to parse content available on the online resource, or analyzing historical logs associated with previous versions of the application.

At 206, the data processing system can determine whether an action repository is available for the type or domain of the application determined at 204. If an action repository is available (e.g., a list of actions that can be executed by the type of application), then the data processing system can select an action from the list of actions at 210. However, if a list of actions is not available in an action repository for this type of application, the data processing system can use a brute force trigger mechanism at 208.

At 208, the brute force trigger mechanism can include selecting an initial or default action. The default action may be general or agnostic to types of action, or may have commonality among different types of actions. The default action can include a query to the application to determine a type of the application, such as "what type of actions can you execute?" The brute force trigger mechanism can include cycling through actions in the action repository for each type of application. For example, there may be 20 different types of applications in the action repository. Each type of application can be associated with one or more actions. The brute force trigger mechanism can include the data processing system selecting a first type and a first action of the first type. The data processing system can then proceed to select a second action of the first type if the first action was successful. If the first action was not successful, or the application was not responsive or indicated that it could not execute those types of actions, then the data processing system can select a first action of a second type for processing.

At 210, the data processing system can generate a trigger phrase based on the selected action. The data processing system can generate the trigger phrase using a natural language generator and the selected action. The data processing system can generate the trigger phrase based on machine learning or a predetermined template of phrases.

At 212, the data processing system can execute the application. The data processing system can input the trigger phrase generated at 210 to the application via a conversational interface. The application executed by the data processing system can parse or process the trigger phrase. The application can be executed by a virtual machine or in a sandboxed computing environment. The application can determine, based on the trigger phrase, an action. The application can identify, from a template or action repository, parameters used to execute the action. The application an determine that the trigger phrase did not include values for parameters used to execute the action. The application executed by the data processing system, responsive to determining to request a value for a parameter to execute the action, can generate a first query for the value of the parameter.

At 214, the data processing system can receive the query generated by the application. The data processing system can determine to provide a response to the query. The data processing system can select, at 214, a natural language generation technique to generate the response to the query from the application. The data processing system can select natural language processor of the data processing system, a model trained based on historical logs, select a phrase from a historical log, or use a brute force technique (e.g., template response with placeholder fields) to generate the response.

At 216, the data processing system can generate the response using a technique selected at 214. The data processing system can generate the response including a value for the requested parameter. The value can be a simulated value. The data processing system can provide the value as input to the application. The response can include a request to establish a communication channel, perform another action, ask for help, or any other type of response. The response can be responsive to the query, or, in some cases, be unresponsive to the query. For example, the data processing system can deliberately generate and input a response that is unrelated or unresponsive to the query from the application to evaluate how the application processes an unresponsive response. The data processing system can evaluate the error handling capabilities of the application. The data processing system can evaluate whether the application generates the same query or an alternate query based on the unresponsive response from the data processing system.

At 218, the application or data processing system can determine whether to establish a communication channel (e.g., a phone call, audio call, chat communication, or text communication). The application data processing system can determine to establish the communication channel based on the generated response or a query from the application. If the application determines to establish the communication channel, the data processing system can proceed to establish the communication channel at 220. The communication channel can be between a device of the application developer and a virtual computing device provided by the data processing system that simulates a client computing device. The input generation component can provide voice input for transmission over the communication channel to the device of the application developer.

If the data processing system determines, at 218, not to establish the communication channel, the data processing system can proceed to determine the state of the application and generate an error code at 222. The data processing system can evaluate the state of the application. The state can indicate whether the application is active, inactive, standby, terminated, or not responding, for example. The data processing system can assign an error code based on the state of the application. The data processing system can assign the error code based on one or more factors associated with the state of the application or the execution of the action, including, for example, whether the application successfully executed the action.

At 224, the data processing system can determine whether to terminate execution of the application. The data processing system can determine to terminate or end a process, thread, or communication channel associated with the application. The data processing system can determine to terminate an aspect of the application based on the type of action, status of executing the action, computing resource consumption metric, sensor activity status, or whether a simulated value was provided for execution. If the data processing system determines to terminate a process or communication channel associated with the application, the data processing system can proceed to act 226 to transmit a termination command. If, however, the data processing system determines not to terminate a process or communication channel (e.g., the processes completed successfully or crashed, or no communication channel was established at 218), then the data processing system can proceed to 228 to provide a notification.

At 228, the data processing system can provide a notification of the error code to the application developer device. The data processing system can attempt to apply a patch to resolve issues associated with the application. The data processing system can remove the application from the application delivery server. The data processing system can prevent the application from being delivered to client computing devices based on the error code. For example, responsive to the error code indicating that the application fails to deactivate a sensor, uses excessive computing resources, or fails to request values for parameters used to execute an action, the data processing system can determine to prevent or block the application from being delivered to client computing device. The data processing system can determine to delay launch of the application until the application developer resolves the issues in the application that result in the unsatisfactory error codes. Thus, the data processing system can validate actions in a digital assistant-based application prior to the application being launched or delivered to client computing device to prevent erroneous or faulty execution of the application on client computing devices.

Figure 3:
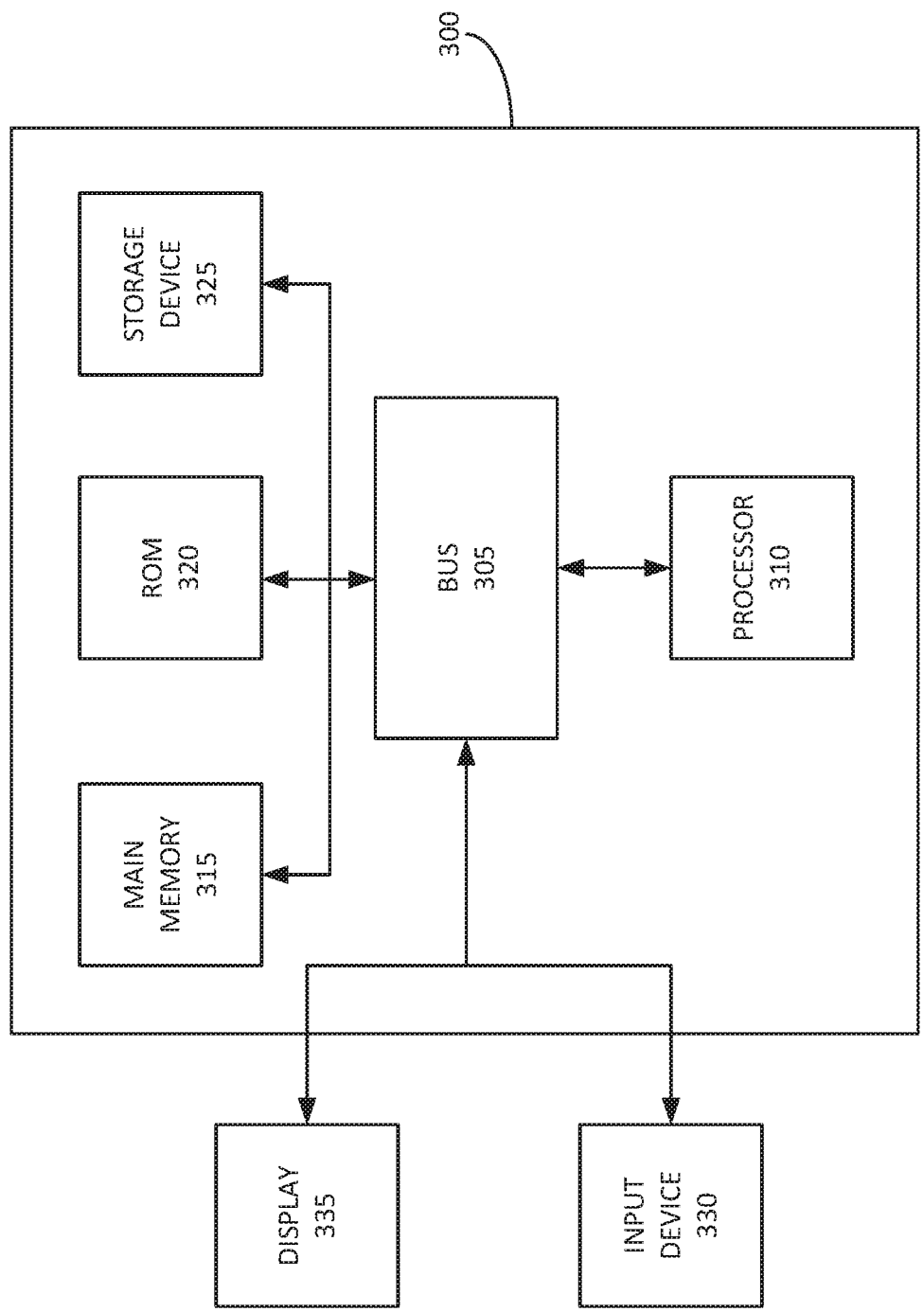
FIG. 3 is a block diagram illustrating a general architecture for a computer system that can be employed to implement elements of the systems and methods described and illustrated herein, including, for example, the system depicted in FIG. 1, and the method depicted in FIG. 2.

FIG. 3 is a block diagram of an example computer system 300. The computer system or computing device 300 can include or be used to implement the system 100, or its components such as the data processing system 102. The data processing system 102 can include an intelligent personal assistant or voice-based digital assistant. The computing system 300 includes a bus 305 or other communication component for communicating information and a processor 310 or processing circuit coupled to the bus 305 for processing information. The computing system 300 can also include one or more processors 310 or processing circuits coupled to the bus for processing information. The computing system 300 also includes main memory 315, such as a random access memory (RAM) or other dynamic storage device, coupled to the bus 305 for storing information, and instructions to be executed by the processor 310. The main memory 315 can be or include the data repository 120. The main memory 315 can also be used for storing position information, temporary variables, or other intermediate information during execution of instructions by the processor 310. The computing system 300 may further include a read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions. The storage device 325 can include or be part of the data repository 120.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating information and command selections to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the display 335. The display 335 can be part of the data processing system 102, the client computing device 140 or other component of FIG. 1, for example.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 300 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 140 or the application developer device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 or the direct action API 108 an be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method of validating actions in a digital assistant-based application, comprising:
   identifying, by a data processing system comprising at least one processor, an application provided by an application developer device of an application developer, the application having a conversational interface;
   selecting, by the data processing system based on the application, an action from an action repository of the data processing system;
   generating, via a natural language processor of the data processing system and based on the action, a trigger phrase for input into the application, the trigger phrase representing a simulated voice-based input detected by a sensor, and the trigger phrase being generated based on logs that include historical trigger phrases detected by sensors of computing devices to initiate execution of actions for the application or other applications having a same type or domain as the application;
   executing, by the data processing system, the application to process the trigger phrase via the conversational interface;
   identifying, by the data processing system, an action of the application responsive to the trigger phrase;
   identifying, by the data processing system, a parameter used by the application to execute the action of the application;
   generating, by the data processing system, based on the parameter and via execution of the conversational interface of the application, a first query responsive to the trigger phrase;
   generating, by the natural language processor of the data processing system, a first response to the first query for input into the application;
   determining, by the data processing system based on execution of the application to process the first response, a state of the application;
   evaluating, by the data processing system, the state of the application to determine an error code; and
   providing, by the data processing system to the application developer device, a notification based on the error code.

2. The method of claim 1, comprising:
   determining the parameter used by the application comprises an electronic account identifier;
   generating the first query comprising a request for the electronic account identifier; and
   generating, via the natural language processor, the first response comprising a simulation value for the electronic account identifier.

3. The method of claim 1, comprising:
   preventing the application from executing the action of the application responsive to a value provided with the first response.

4. The method of claim 1, comprising:
   determining the state of the application is a termination state;
   evaluating the state of the application to determine a resource utilized by the application is active; and
   generating the error code indicating that the application failed to deactivate the resource responsive to the termination state.

5. A system to validate actions in a digital assistant-based application, comprising:
   a data processing system comprising one or more processors to:
   identify an application provided by an application developer device of an application developer, the application having a conversational interface;
   select, for the application, an action from an action repository of the data processing system;
   generate, based on the action and via a natural language processor of the data processing system, a trigger phrase for input into the application, the trigger phrase representing a simulated voice-based input detected by a sensor, and the trigger phrase being generated based on logs that include historical trigger phrases detected by sensors of computing devices to initiate execution of actions for the application or other applications having a same type or domain as the application;
   execute the application to process the trigger phrase via the conversational interface, and identify an action of the application responsive to the trigger phrase;
   identify a parameter used by the application to execute the action of the application;
   generate, based on the parameter and via execution of the conversational interface of the application, a first query responsive to the trigger phrase;
   generate, via the natural language processor, a first response to the first query for input into the application;
   determine, based on execution of the application to process the first response, a state of the application;
   evaluate the state of the application to determine an error code; and
   provide, to the application developer device, a notification based on the error code.

6. The system of claim 5, wherein the trigger phrase is a sentence that is constructed by the natural language processor to initiate execution of the action.

7. The system of claim 5, comprising the data processing system to:

determine the parameter used by the application comprises an electronic account identifier;
generate the first query comprising a request for the electronic account identifier; and
generate, via the natural language processor, the first response comprising a simulation value for the electronic account identifier.

8. The system of claim 5, comprising the data processing system to:
prevent the application from executing the action of the application responsive to a value provided with the first response.

9. The system of claim 5, comprising the data processing system to:
determine the state of the application is a termination state;
evaluate the state of the application to determine a resource utilized by the application is active; and
generate the error code indicating that the application failed to deactivate the resource responsive to the termination state.

10. The system of claim 5, comprising the data processing system to:
determine the state of the application is a termination state;
detect that a client device sensor utilized by the application is active; and
generate the error code indicating that the application failed to deactivate the client device sensor responsive to the termination state.

11. The system of claim 5, comprising the data processing system to:
generate the first response based on a model trained with historical logs comprising responses detected by microphones of computing devices.

12. The system of claim 5, comprising the data processing system to:
select, based on a metric associated with a model trained with historical logs, a metric of the model or a predetermined response repository for generation of the first query; and
generate, based on the selection, the first response via the metric of the model or the predetermined response repository.

13. The system of claim 5, comprising the data processing system to:
establish, responsive to the first response, a telecommunication channel between a virtual client device and the application; and
provide, via the virtual client device and through the telecommunication channel, a second response to the application.

14. The system of claim 5, comprising the data processing system to:
establish, responsive to the first response, a telecommunication channel between a device associated with the application developer and a virtual client device; and
provide, via the virtual client device and through the telecommunication channel, a second response to the device associated with the application developer.

15. The system of claim 5, comprising the data processing system to:
generate a second response based on a semantic analysis of the first response, the first query, and the trigger phrase; and
provide the second response for processing by the application executed by the data processing system.

16. The system of claim 5, comprising the data processing system to:
identify a virtual client account; and
provide information associated with the virtual client account to the application to process the action of the application responsive to the first response.

17. The system of claim 5, comprising the data processing system to:
identify a virtual client account;
provide information associated with the virtual client account to the application to process the action responsive to the first response; and
block, responsive to detection of the virtual client account, execution of the action of the application by the application.

18. The system of claim 5, wherein the error code indicates that the application attempted to execute the action of the application with a missing value or partial data for the parameter used by the application to execute the action of the application.

19. A system to validate actions in a digital assistant-based application, comprising:
a data processing system comprising one or more processors to:
identify an application provided by an application developer device of an application developer, the application having a conversational interface;
select, for the application, an action from an action repository of the data processing system;
generate, based on the action and via a natural language processor of the data processing system, a trigger phrase for input into the application, the trigger phrase representing a simulated voice-based input detected by a sensor;
execute the application to process the trigger phrase via the conversational interface, and identify an action of the application responsive to the trigger phrase;
identify a parameter used by the application to execute the action of the application;
generate, based on the parameter and via execution of the conversational interface of the application, a first query responsive to the trigger phrase;
generate, via the natural language processor, a first response to the first query for input into the application;
establish, responsive to the first response, a telecommunication channel between a device associated with the application developer and a virtual client device;
determine, based on execution of the application to process the first response, a state of the application, including:
detecting termination of the telecommunication channel; and
identifying, responsive to termination of the telecommunication channel, a state of a microphone of the virtual client device;
evaluate the state of the application to determine an error code, including setting the error code based on the state of the microphone of the virtual client device being active; and
provide, to the application developer device, a notification based on the error code.

* * * * *